United States Patent
Varanasi et al.

(10) Patent No.: US 11,695,827 B2
(45) Date of Patent: *Jul. 4, 2023

(54) DYNAMICALLY COMPUTING LOAD BALANCER SUBSET SIZE IN A DISTRIBUTED COMPUTING SYSTEM

(71) Applicant: Uber Technologies, Inc., San Francisco, CA (US)

(72) Inventors: Prashant Varanasi, San Francisco, CA (US); Chien-Chih Liao, San Francisco, CA (US); Simon Jeffrey Newton, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,906

(22) Filed: Sep. 21, 2021

(65) Prior Publication Data
US 2022/0006859 A1 Jan. 6, 2022

Related U.S. Application Data

(63) Continuation of application No. 16/672,270, filed on Nov. 1, 2019, now Pat. No. 11,165,860.

(51) Int. Cl.
*H04L 67/1036* (2022.01)
*H04L 67/60* (2022.01)
(Continued)

(52) U.S. Cl.
CPC .......... *H04L 67/1036* (2013.01); *H04L 47/28* (2013.01); *H04L 67/01* (2022.05); *H04L 67/60* (2022.05)

(58) Field of Classification Search
None
See application file for complete search history.

(56) References Cited

U.S. PATENT DOCUMENTS 7,284,067 B2 * 10/2007 Leigh .................. H04L 67/1029
709/243
9,025,459 B2 5/2015 Fung
(Continued)

OTHER PUBLICATIONS

Andreolini, S., et al., "Dynamic load balancing for network intrusion detection systems based on distributed architectures," Sixth IEEE International Symposium on Network Computing and Applications (NCA 2007), Cambridge, MA, 2007, pp. 153-160.
(Continued)

*Primary Examiner* — Joshua Joo
(74) *Attorney, Agent, or Firm* — Fenwick & West LLP (57) ABSTRACT

A distributed computing system uses dynamically calculates a subset size for each of a plurality of load balancers. Each of a plurality of load balancers logs requests from client devices for connections to back-end servers and periodically sends a request report to a traffic aggregator, which aggregates the report requests from the load balancers in the corresponding zone. Each traffic aggregator sends the aggregated request data to a traffic controller, which aggregates the request data to determine a total number of requests received at the system. The total request data is transmitted through each traffic aggregator to each load balancer instance, which calculates a percentage of the total number of requests produced by the load balancer and determines a subset size based on the calculated percentage.

19 Claims, 4 Drawing Sheets

(51) Int. Cl.
*H04L 47/28* (2022.01)
*H04L 67/01* (2022.01)

(56) References Cited

U.S. PATENT DOCUMENTS

| | | | |
|---|---|---|---|
| 9,647,943 B2 | 5/2017 | Layman et al. | |
| 10,104,166 B2 | 10/2018 | Chauhan | |
| 10,454,830 B2 | 10/2019 | Xu et al. | |
| 10,979,493 B1 | 4/2021 | Farrugia et al. | |
| 2012/0296866 A1* | 11/2012 | Doddavula | G06F 16/27 707/E17.005 |
| 2013/0179888 A1 | 7/2013 | Russell | |
| 2016/0094452 A1 | 3/2016 | Jain et al. | |
| 2016/0094453 A1 | 3/2016 | Jain et al. | |
| 2016/0094643 A1 | 3/2016 | Jain et al. | |
| 2017/0318086 A1* | 11/2017 | McMullen | H04L 67/568 |
| 2018/0139269 A1 | 5/2018 | Wu et al. | |
| 2018/0167461 A1 | 6/2018 | Shen | |
| 2019/0356735 A1 | 11/2019 | McMullen | |
| 2019/0394284 A1 | 12/2019 | Baghel et al. | |
| 2020/0358655 A1 | 11/2020 | Pinos et al. | |
| 2020/0389517 A1 | 12/2020 | Eloy et al. | |
| 2021/0120079 A1* | 4/2021 | Pahwa | H04L 67/34 |
| 2021/0359945 A1* | 11/2021 | Jain | H04L 67/1001 |
| 2022/0029920 A1* | 1/2022 | Abhigyan | H04L 45/74 |

OTHER PUBLICATIONS

Cao, J. et al., "Scalable load balancing on distributed web servers using mobile agents," Journal of Parallel Distributed Computing, 63(10), 2003, pp. 996-1005.

United States First Action Interview Office Action, U.S. Appl. No. 16/672,270, dated Nov. 24, 2020, six pages.

United States Preinterview Office Action, U.S. Appl. No. 16/672,270, dated Jun. 23, 2020, four pages.

* cited by examiner

DYNAMICALLY COMPUTING LOAD BALANCER SUBSET SIZE IN A DISTRIBUTED COMPUTING SYSTEM

CROSS REFERENCE TO RELATED APPLICATIONS

This application is a continuation of co-pending U.S. application Ser. No. 16/672,270, filed Nov. 1, 2019, which is incorporated by reference in its entirety.

TECHNICAL FIELD

This disclosure relates to distributed computing systems, and in particular, to using multi-tiered aggregation to dynamically calculate subset sizes for a plurality of load balancer instances.

BACKGROUND

Distributed computing systems disperse data and processing tasks over a network to a plurality of interconnected server instances. Such systems may employ one or more front-end servers, or load balancers, to balance the load distributed to each back-end server in the computing system using, for example, weighted round-robin or least-connection algorithms. Each load balancer may limit the number of connections to the back-end servers in a zone by determining a subset size and using an algorithm to define the subset of back-end servers to which the load balancers will route client connection requests. In current implementations, each load balancer in a zone uses the same subset size and thus the same number of connections to the back-end servers. This method assumes, however, that each load balancer in the computing system receives approximately the same number of client requests for access to the back-end servers. This can create a problem, particularly in large-scale computing systems, in instances where the number of requests received at a first load balancer exceeds the number of requests received at one or more other load balancers. In that case, despite having a higher level of demand, the first load balancer is limited to the same subset size as the one or more other load balancers, creating inefficiencies in the load distribution process.

SUMMARY

Systems and methods are disclosed herein for using multi-tiered aggregation to dynamically calculate a subset size for each of a plurality of load balancers in a distributed computing system. According to an example, one or more client devices request connection to, transmit data to, and/or request data from one or more back-end servers. The requests are routed through a network to one or more load balancer instances that distribute the requests amongst the back-end servers to balance the load on the respective servers. Each load balancer instance logs a number of connection requests received from client devices (e.g., a number of requests per second) and sends a request report to a traffic aggregator, which aggregates the request reports received from the load balancers in the zone. Each traffic aggregator sends aggregated request data for the corresponding zone to a traffic controller, which aggregates the request data to determine a total number of requests received at the computing system. The total request data is transmitted (directly or through the traffic aggregator) to each load balancer instance, which calculates a percentage of the total number of requests produced by the load balancer instance and determines a subset size based on the calculated percentage. In one embodiment, updated demand data is provided to the traffic controller and updated total demand levels are calculated periodically (e.g., once a minute) such that subset sizes for each load balancer are dynamically adjusted based on current demand levels.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
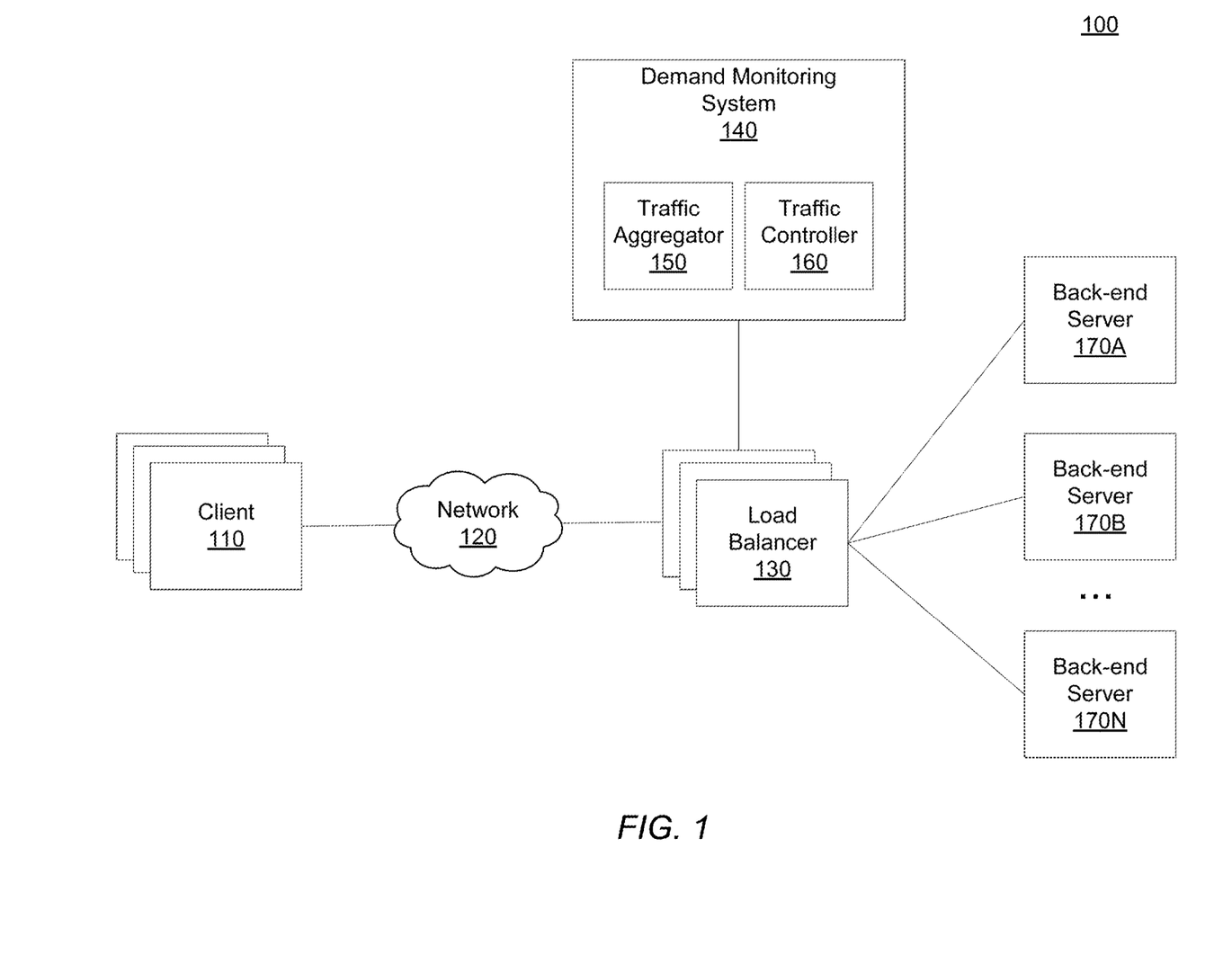
FIG. 1 is a block diagram illustrating a distributed computing system, according to one embodiment.

FIG. 1 is a block diagram illustrating the system environment for an example distributed computing system 100, according to one embodiment. The distributed computing system 100 disperses connection requests over a network of interconnected back-end servers 170 that provide processing to one or more requesting clients 110. In this example embodiment, the distributed computing system 100 includes one or more clients 110 in communication via a network 120 with a demand monitoring system 140 and one or more load balancers 130 that route requests received from the clients 100 to one or more back-end servers 170. Three clients 110, load balancers 130, and back-end server 170 are shown in FIG. 1 in order to simplify and clarify the description. Embodiments of the distributed computing system 100 can have many clients 110, load balancers 130, and back-end servers 170. Likewise, the functions performed by the various entities of FIG. 1 may be distributed among the elements in a different manner than described.

FIG. 1 uses like reference numerals to identify like elements. A letter after a reference numeral, such as "170A," indicates that the text refers specifically to the element having that particular reference numeral. A reference numeral in the text without a following letter, such as "170," refers to any or all of the elements in the figures bearing that reference numeral. For example, "170" in the text refers to reference numerals "170A," "170B," and/or "170N" in the figures.

A client 110 is an electronic device such as a smartphone, tablet device, wearable computing device (e.g. a smartwatch), or a similar device. Alternatively, the client 110 is a conventional computer system, such as a desktop or laptop computer or a server. As an addition or an alternative, a client 110 can refer to a service that runs on or operates on a computing device or system. Clients typically have one or more processors, memory, touch screen displays, wireless networking system (e.g., IEEE 802.11), cellular telephony support (e.g. LTE/GSM/UMTS/CDMA/HSDPA, etc.), and location determination capabilities. Clients 110 are configured to communicate with the load balancers 130 through the network 120.

One or more clients 110 request connection to, transmit data to, and/or request data from one or more back-end servers 170. For purposes of simplicity, such requests and data transmissions are referred to throughout the disclosure as "connection requests." In one embodiment, connection requests from the one or more clients 110 are received at one or more load balancers 130, which distribute the requests among the back-end servers 170. While the load balancers 130 shown in FIG. 1 are hardware components connected to the demand monitoring system 140, in other embodiments, the load balancers 130 are deployed as software executing on the demand monitoring system 140 or the client 110

In one embodiment, each load balancer 130 establishes connections to a subset of the one or more back-end servers 170 and routes connection requests received from the clients 110 to one or more of the back-end servers 170 in the corresponding subset. Subsetting limits the number of back-end servers 170 to which each load balancer 130 connects and avoids a situation in which a single load balancer 130 connects to a large number of back-end servers 170 and in which a single back-end server 170 receives connections from a large number of load balancers 130. In both situations, resources are wasted and significant strain is placed on the computing system. Subsetting provides a solution to this problem by determining, for each load balancer 130, a subset size that represents the number of connections between the load balancer 130 and the one or more back-end servers 170.

Connection requests may be distributed to the back-end servers 170 in each subset using a variety of techniques. For example, in one embodiment, the load balancer 130 distributes requests using a round-robin algorithm, in which requests are distributed in a rotational basis to the back-end servers 170, with each back-end server 170 receiving one request per rotation. Additionally or alternatively, the load balancer 130 may use a least connection algorithm that takes into account the current load of the back-end servers 170 such that the load balancer 130 routes requests to back-end servers 170 that are experiencing the least active sessions. In still other embodiments, the load balancer 130 uses other distribution algorithms, such as least response time, fixed weighted, or source IP hash.

In some embodiments, the load balancers 130 are arranged in zones. A zone includes a group of load balancers 130 that may share fault domains (e.g., the load balancers 130 are located in a building sharing common power, networking, etc.). Each zone may have the same number of load balancers 130 (e.g., tens of thousands), or, alternatively, the number of load balancers 130 may differ among zones. In some embodiments, the demand monitoring system adjusts the distribution of load balancers 130 in the zones in response to detecting a new load balancer 130 and/or determining that an existing load balancer 130 is no longer active. Still further, in other configurations, the load balancers 130 are not arranged in zones. Rather, the multi-tiered aggregation described herein may be performed globally (i.e., for all load balancers 130 in the distributed computing system 100) or within multiple zones.

Each load balancer 130 logs connection requests received from the clients 110 and periodically (e.g., once per second or once per minute) sends the number of received requests to the demand monitoring system 140, which returns to the load balancer 130 data including the total number of requests received by the plurality of load balancers 130. As discussed below with respect to FIG. 3, in one example, in response to receiving the request data from the demand monitoring system 140, each load balancer 130 computes a percentage of the total number of requests associated with the load balancer 130 and determines a subset size based on the computed percentage and the total number of available back-end servers 150 in the distributed computing system 100. For example, in one embodiment, the demand monitoring system 140 might determine that a total of 10,000 requests were received during a first reporting window at a distributed computing system 100 having 400 back-end servers 150. If a first load balancer 130A received 500 of the requests, responsive to receiving the total request data, the first load balancer 130A computes its percentage of the total requests as 5% and thus calculates a subset size of 20 for the first reporting window (i.e., the first load balancer 130A will establish connections to 5% of the 400 back-end servers 150). That is, for the first reporting window, the load balancer 130A will establish 20 connections between requesting clients 110 and back-end servers 150. If, during the second reporting window, the first load balancer 130A determines that it received 600 of 8,000 total requests, the first load balancer 130A calculates a subset size of 30 (i.e., 7.5% of 400) for the second reporting window. Additionally, in some embodiments, the load balancer 130 multiplies its percentage of total requests by a constant factor multiple to determine the subset size. For example, the 20 connections associated with the load balancer 130A may be calculated by a constant multiple of 3 such that the total subset size for the load balancer 130A for the first reporting window is 60. Multiplying the percentage of total requests by the constant factor increases the likelihood that the subsets will cover all hosts and can help the distributed computing system 100 more efficiently respond to spikes in demand. Additionally, by recalculating the subset size for each reporting window, each load balancer 130 dynamically adjusts the number of connections to the back-end servers 150 based on current demand levels and may thus more efficiently allocate connection requests in the distributed computing system 100. For example, if a burst of requests is received at a first load balancer 130, the load balancer 130 will calculate a larger subset size for the reporting window such that the load is more evenly and efficiently distributed across a larger set of available back-end servers 150. In addition to the total number of requests received at the load balancers 130, the demand monitoring system 140 can also monitor the number of load balancers 130 making requests to a specific back-end server 170. In one embodiment, the back-end server 170 data is returned to the load balancer 130 for use in calculating the subset size.

The demand monitoring system 140 includes one or more traffic aggregators 150 and one or more traffic controllers 160. In one embodiment, the demand monitoring system 140 assigns one or more traffic aggregators 150 to each zone. The traffic aggregators 150 aggregate request data received from the load balancers 130 in the zone and periodically (e.g., once per second or once per minute) send the aggregated request data for the corresponding zone to one or more traffic controllers 160. Responsive to receiving the aggregated request data from the one or more traffic aggregators 150, the traffic controllers 160 compute the total number of requests received by the load balancers 130 and return the computed total to the traffic aggregators 150, which send the computed total to the load balancers 130 in the corresponding zone for calculation of each load balancer's subset size. Additionally, in one embodiment, the demand monitoring system 140 includes a plurality of traffic controllers 160, with each traffic aggregator 150 connected to each traffic controller 160 such that if one or more traffic controllers 160 are unavailable, the load balancers 130 remain connected to, and transmit aggregated request data to, the remaining traffic controllers 160.

Figure 2:
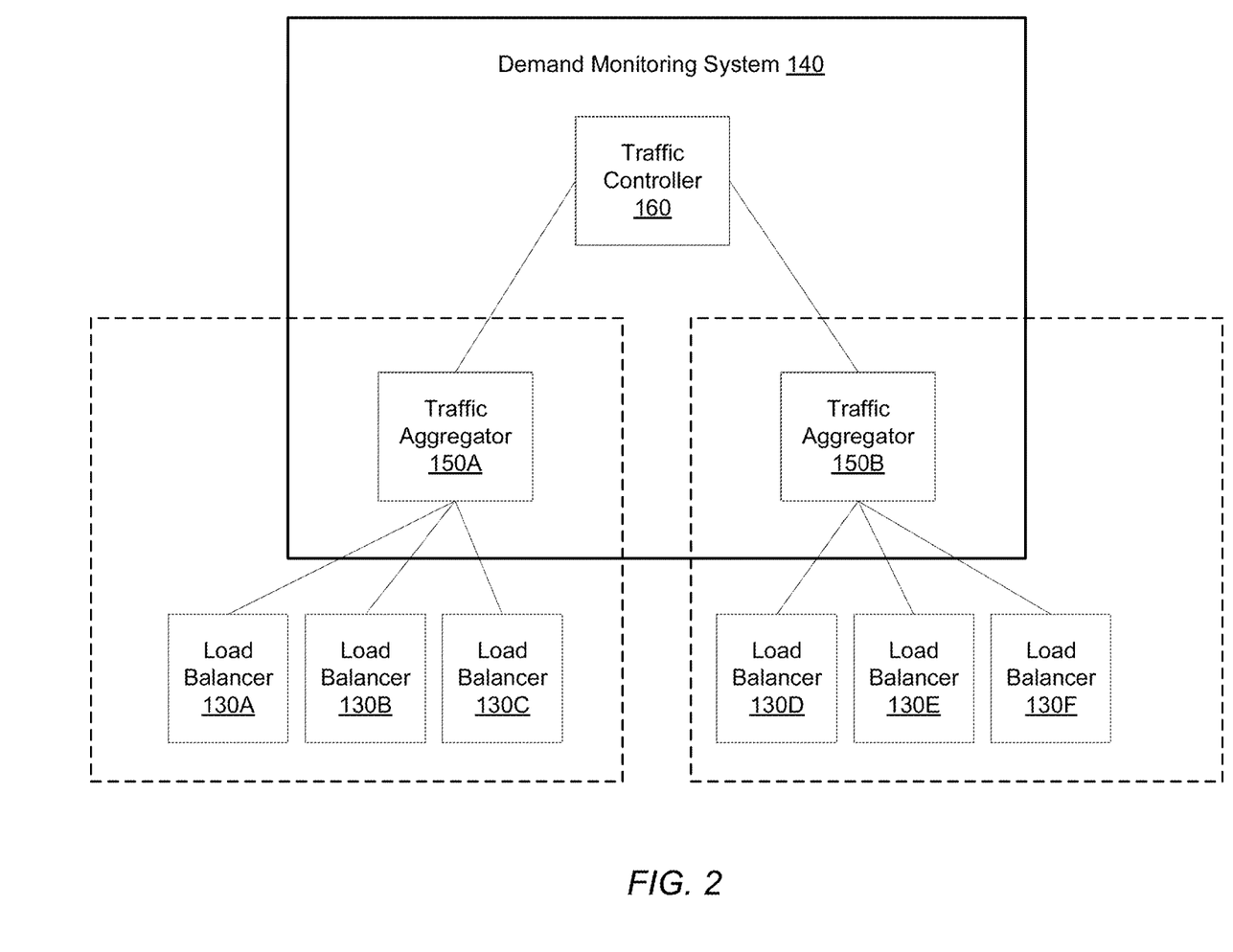
FIG. 2 is a block diagram illustrating a demand monitoring system of the distributed computing system, according to one embodiment.

FIG. 2 is a block diagram illustrating the demand monitoring system 140, according to one embodiment. In the embodiment shown in FIG. 2, the demand monitoring system 140 includes one or more traffic aggregators 150A and 150B connected to a traffic controller 160. Each traffic aggregator 150 is assigned to a zone that includes a plurality of load balancers 130. For example, the traffic aggregator 150A is assigned to a first zone including load balancers 130A, 130B, and 130C, while the traffic aggregator 150B is assigned to a second zone including load balancers 130D, 130E, and 130F. While the displayed embodiment includes only two zones, each with one traffic aggregator 150A, in other embodiments, the demand monitoring system 140 includes a plurality of zones with each zone including one or more additional traffic aggregators 150. For example, in one embodiment, the demand monitoring system 140 includes one traffic aggregator 150 for each designated number of load balancers 130 (e.g., one traffic aggregator 150 per each 5000 load balancers 130). However, each load balancer 130 communicates with a single traffic aggregator 150, regardless of how many traffic aggregators 150 are in the corresponding zone. If the traffic aggregator 150 to which a load balancer 130 sends request data fails or is otherwise unavailable, the load balancer 130 connects to another traffic aggregator 150 in the zone.

Each load balancer 130 receives requests from one or more clients 110 for connection to a back-end server 170. For example, the request may be to access data stored on the back-end server 170, to transmit data to the back-end server 170, and/or to access a database through the back-end server 170. In one embodiment, each load balancer 130 periodically generates a request report that includes a number of requests received at the load balancer 130, such as a number of requests per second (RPS) received since the previous request report was generated. In some embodiments, the request report includes additional information about the load balancer 130 and/or the received requests, such as characteristics of the back-end servers 170 and response types (e.g., successes or failures).

Each load balancer 130 sends the generated request report to the corresponding traffic aggregator 150 in the zone to which the load balancer 130 is assigned. In one embodiment, if the load balancers 130 in a zone determine that the one or more traffic aggregators 150 for the zone are unavailable, the load balancers 130 send the request reports to a traffic aggregator 150 in a nearby back-up zone.

Each traffic aggregator 150 receives the request reports from the load balancers 130 in the corresponding zone and periodically (e.g., at 1 second intervals) aggregates the reports to compute aggregated request data for the zone. In one embodiment, the aggregated request data comprises the total number of requests received by the load balancers 130 in the zone during a reporting window (e.g., the time since the previous aggregated request data was calculated). Additionally, in embodiments where a zone has multiple traffic aggregators 150, each traffic aggregator 150 receives a request report from a portion of the zone (i.e., from the load balancers 130 connected to the traffic aggregator 150). Responsive to a traffic aggregator 150 determining that no request report has been received from a load balancer 130 during the last reporting window, the traffic aggregator 150 uses the most recent request report from the non-reporting balancer 130 to calculate the aggregated request data for the corresponding zone. In one embodiment, however, if the traffic aggregator 150 determines that no request report has been received from a load balancer 130 within a threshold period of time (e.g., 5 seconds), the traffic aggregator 150 does not include data for the non-reporting load balancer 130 when calculating the aggregated request data for the zone.

In some embodiments, the traffic aggregator 150 queries the load balancers 130 in the corresponding zone for updated request reports responsive to detecting the addition of one or more new load balancers 130 to the zone. The traffic aggregator 150 aggregates the request reports received from the existing load balancers 130 and the one or more new load balancers 130 to generate updated aggregated request data for the zone. In this way, the percentage of total demand for each load balancer 130 (and thus, the subset size for the load balancer 130) is adjusted responsive to the addition of one or more new load balancers 310 to the zone. Similarly, if the traffic aggregator 150 determines that a load balancer 130 in the corresponding zone is not currently active (e.g., the load balancer 130 has not sent a request report within a threshold period of time, the load balancer 130 is being drained, etc.), the traffic aggregator 150 queries the remaining load balancers 130 in the zone such that each load balancer's percentage of total demand is adjusted to account for the removal of the inactive load balancer 130.

The traffic controller 160 receives aggregated request data from each of the traffic aggregators 150 and aggregates the received request data to generate a total number of requests received by the load balancers 130 during the reporting window (e.g., the last minute). The total request data is returned to each traffic aggregator 150, which sends the data to the load balancers 130 in the corresponding zone. Using this multi-tier aggregation approach to calculating demand avoids a situation in which the traffic controller 160 communicates directly with each load balancer 130 in the distributed computing system 100. Direct aggregation of request data by the traffic controller 160 may strain the traffic controller 160, particularly in large-scale computing systems. Additionally, in some embodiments, the traffic controller 160 tracks total demand by zone and where connection requests are routed, and generates and reports metrics associated with the request data.

The traffic controller 160 may be stateful or stateless. In some embodiments where the traffic controller 160 is stateful, request data is analyzed and stored to monitor changes in demand over time. The traffic controller 160 may use historical demand data to predict upcoming demand, determine whether additional load balancers 130 should be added to the distributed computing system 100, and the like. In embodiments where the traffic controller 160 is stateless, received request data is not stored and is discarded after the end of each reporting window.

Figure 3:
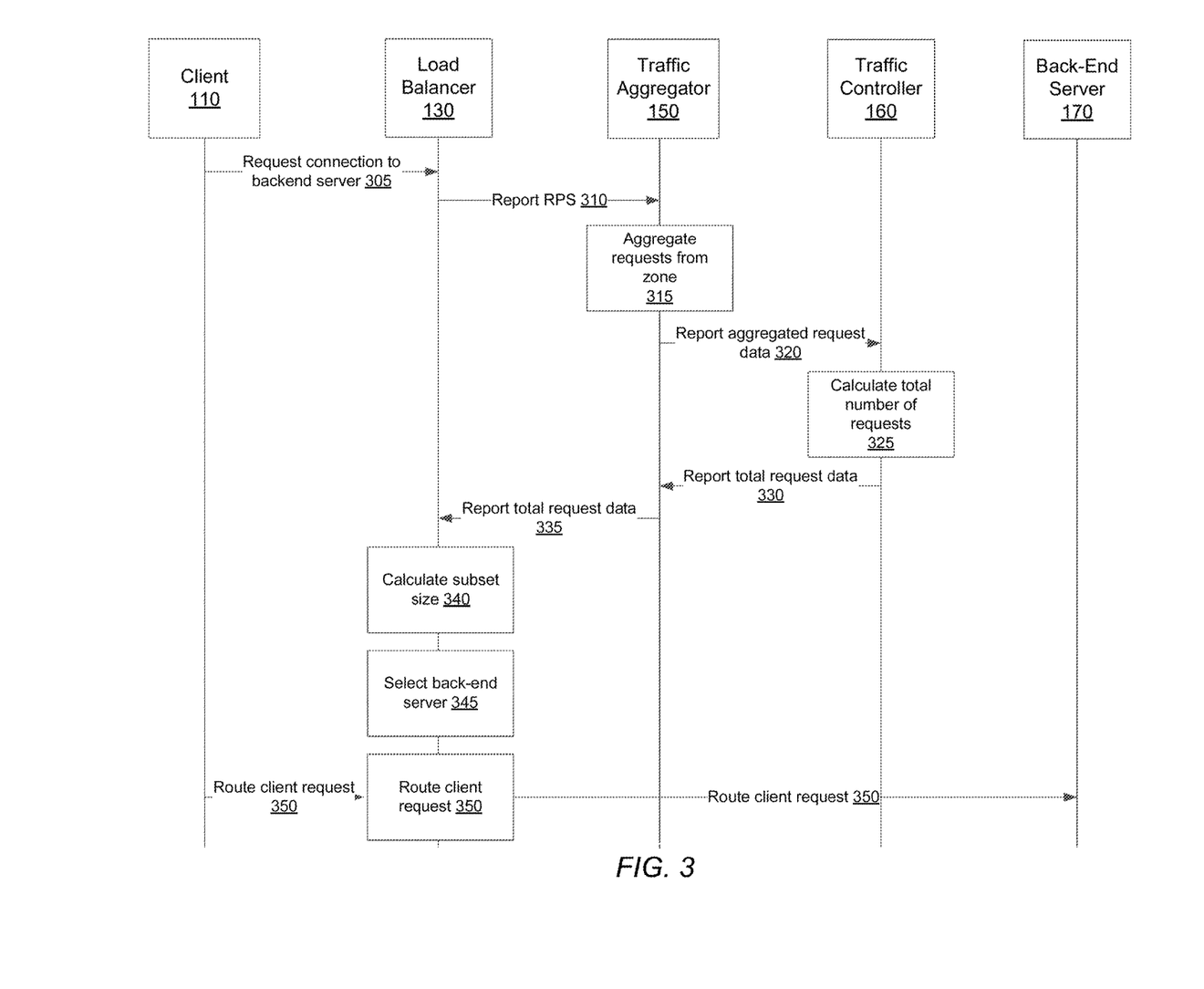
FIG. 3 is an interaction diagram for dynamically calculating a subset size, according to one embodiment.

FIG. 3 is an interaction diagram for dynamically calculating a subset size for one or more load balancers 130 in a distributed computing system 100, in accordance with an embodiment. The steps of FIG. 3 are illustrated from the perspective of the demand monitoring system 140. However, some or all of the steps may be performed by other entities or components. In addition, some embodiments may perform the steps in parallel, perform the steps in different orders, or perform different steps. Further, while the described embodiment includes a single connection request from a client 110, other embodiments include many clients making connection requests to many load balancers 130.

At 305, a client 110 sends a request through the network 120 to a load balancer 130, requesting connection to a back-end server 170. In various embodiments, the client request is a request for performance of work, a request to transmit data to the back-end server 170, a request to receive data from the back-end server 170, or any other type of request that would require a connection to a back-end server 170 in the distributed computing system 100.

Each load balancer 130 periodically generates a request report that includes a number of connection requests received from clients 110 in a corresponding zone during a specified time period. For example, in one embodiment, each load balancer 130 generates a request report that specifies a number of requests per second (RPS) or requests per minute (RPM) received at the load balancer 130 during the reporting window (i.e., since the previous report was generated). The load balancer 130 sends 310 the request report to a traffic aggregator 150 for the zone in which the load balancer 130 is located, which aggregates 315 request reports received from each load balancer 130 in the zone (or the portion of the zone associated with the traffic aggregator 150) to determine a total number of requests received by the load balancers 130 during the reporting window. In one embodiment, if the traffic aggregator 150 determines that a report request has not been received from a load balancer 130 in the zone during the last reporting window or within a threshold period of time after the most recent request report was received (e.g., 1 second after a request report was received from the previous reporting load balancer 130), the traffic aggregator 150 uses a most recent request report received from the non-reporting load balancer 130 in calculating the aggregated request data.

Each traffic aggregator 150 reports 320 the aggregated request data to the traffic controller 160, which calculates 325, based on the received reports, a total number of requests received at all load balancers 130 in the distributed computing system 100 during the reporting window. The total request data is reported 330 to each traffic aggregator 150, which sends 335 the data to each load balancer 130 in the corresponding zone. Additionally, in some embodiments, the traffic controller 160 uses the received reports to determine a level of demand by zone and available capacity by zone and sends assignments to the traffic aggregators 150 regarding how to distribute the demand based on the available capacity, taking into account, for example, the latency and cost associated with making requests outside of a zone.

In response to receiving the total request data, each load balancer 130 calculates 340, for the corresponding reporting window, a subset size that defines a number of connections between the load balancer 130 and one or more back-end servers 170. In one embodiment, the subset size is based on the percentage of the total connection requests that are received at the load balancer 130 and the number of available back-end servers 170 in the distributed computing system 100. For example, for a distributed computing system 100 having 300 back-end servers 170, a first load balancer 130A that received 30% of the total requests for a reporting window calculates a subset size of 90 for the reporting window while a second load balancer 130B that received 15% of the total requests for the reporting window calculates a subset size of 45. In another embodiment, the subset size is calculated based on the number of load balancers 130 that received connection requests and the number of available back-end servers 170.

After calculating a subset size for the reporting window, each load balancer 130 selects 345 a back-end server 170 to service each connection request received at the load balancer 130. The load balancer 130 may use a variety of techniques, such as a round-robin algorithm, a least-connection algorithm, or random assignment, to select a back-end server 170 to service each connection request. Responsive to selecting a back-end server 170, the load balancer 130 routes 350 the connection request from the client 110 to the selected back-end server 170. In some embodiments, each load balancer 130 may route connection requests to a subset of the available back-end servers 170. Alternatively, a load balancer 130 may route to any back-end server 170 in the distributed computing system 100. Back-end servers 170 having similar characteristics (e.g., servers located physically close to each other and accessible with similar latency characteristics) may be grouped, and subset size may be calculated for these similar back-end servers 170. The load balancer 130 may therefore distribute connection requests to the similar back-end servers 170 without preference to an individual server 170.

Computing Hardware

Figure 4:
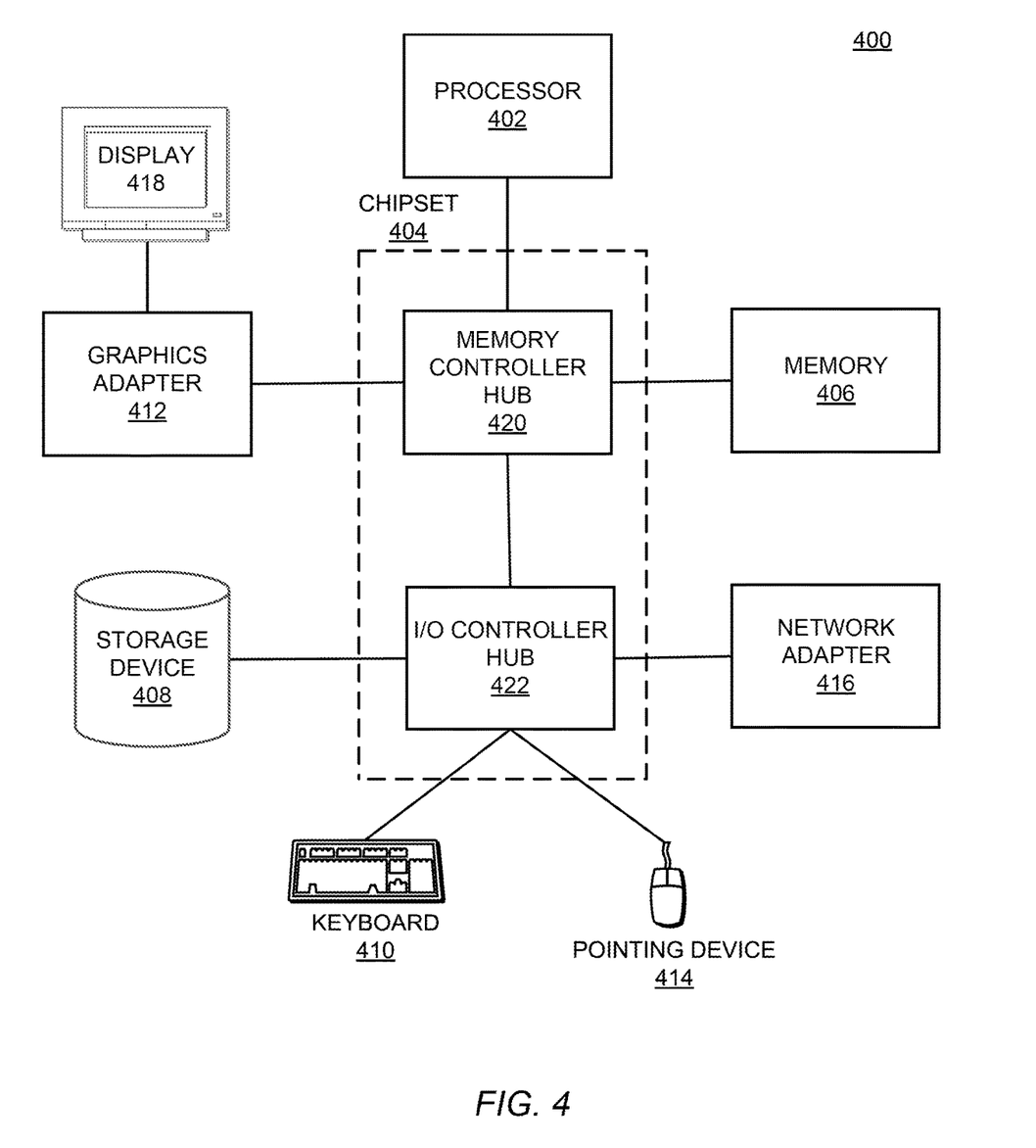
FIG. 4 is a block diagram that illustrates a computer system, according to one embodiment.

The entities shown in FIG. 1 are implemented using one or more computers. FIG. 4 is a block diagram that illustrates a computer system 400 for acting as a client 110, a load balancer 130, the demand monitoring system 140, or a back-end server 150, according to one embodiment. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer system 400. The graphics adapter 412 displays images and other information on the display 418. The network adapter 416 couples the computer system 400 to the network 120.

As is known in the art, a computer 400 can have different and/or other components than those shown in FIG. 4. In addition, the computer 400 can lack certain illustrated components. For example, the computer can be formed of multiple blade servers linked together into one or more distributed systems and lack components such as keyboards and displays. Moreover, the storage device 408 can be local and/or remote from the computer 400 (such as embodied within a storage area network (SAN)).

Additional Considerations

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore, it has also proven convenient at times to refer to these arrangements of operations as modules without loss of generality. The described operations and their associated modules may be embodied in software firmware hardware or any combinations thereof.

Any of the steps operations or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention which is set forth in the following claims.

The invention claimed is:

1. A computer-implemented method for dynamically subsetting a plurality of load balancers in a distributed computer system, the method comprising:
   receiving, at each of one or more traffic aggregators from each of a plurality of load balancers in a zone corresponding to that traffic aggregator, a request report including a number of requests received by that load balancer;
   sending, from each of the one or more traffic aggregators to a traffic controller, aggregated request data for the corresponding zone, the aggregated request data comprising a total number of requests received by the load balancers in the zone;
   computing, by the traffic controller based on the aggregated request data for each zone, a total number of requests received by all of the load balancers in the distributed computer system; and
   sending, from the traffic controller to each of the plurality of load balancers in the distributed computer system, data corresponding to the total number of requests received by all of the load balancers, wherein each load balancer of the plurality of load balancers in the distributed computer system computes a subset size based, at least in part, on a percentage of the total number of requests that are received at the load balancer.

2. The method of claim 1, wherein the subset size comprises a number of connections between one or more clients and one or more back-end servers.

3. The method of claim 1, wherein a request received by a load balancer comprises a request for a connection from a client to one or more back-end servers.

4. The method of claim 1, further comprising:
   periodically recomputing, by the traffic controller, the total number of requests based on updated aggregated request data received from each of the one or more traffic aggregators; and
   sending, by the traffic controller, an updated total number of requests to each of the plurality of load balancers in the distributed computer system, wherein each load balancer of the plurality of load balancers in the distributed computer system computes an updated subset size based on a percentage of total demand that is received at the load balancer.

5. The method of claim 4, further comprising:
   determining, by at least one traffic aggregator of the one or more traffic aggregators, that an updated request report has not been received from at least one load balancer in the corresponding zone; and
   computing, by the at least one traffic aggregator, updated aggregated request data based in part on a most recent request report received from the at least one load balancer.

6. The method of claim 1, further comprising:
   detecting, by at least one traffic aggregator of the one or more traffic aggregators, an addition of at least one load balancer to the distributed computer system;
   sending updated aggregated request data to the traffic controller, the updated aggregated request data including a number of requests received at the additional load balancer;
   computing, by the traffic controller based on the updated aggregated request data, an updated total number of requests; and
   sending, from the traffic controller to each of the plurality of load balancers in the distributed computer system, the updated total number of requests, wherein each load balancer of the plurality of load balancers in the distributed computer system computes an updated subset size based on a percentage of total demand received at the load balancer.

7. The method of claim 1, further comprising:
   storing, by the traffic controller, historical data regarding the number of requests received at the plurality of load balancers in the distributed computer system;
   predicting, using the stored historical data, upcoming demand levels on the plurality of load balancers in the distributed computer system; and
   determining, based on the predicted upcoming demand levels, whether to add additional load balancers to the distributed computer system.

8. A computer-implemented method for dynamically subsetting a plurality of load balancers in a distributed computer system, the method comprising:
   receiving, at each load balancer of the plurality of load balancers in the distributed computer system, one or more requests for connections to one or more back-end servers;

computing, by each load balancer of the plurality of load balancers in the distributed computer system, a number of requests received at the load balancer;

sending, from each load balancer of the plurality of load balancers in the distributed computer system to one or more traffic aggregators, a request report including the computed number of requests received at that load balancer;

receiving, at each load balancer of the plurality of load balancers in the distributed computer system, from a traffic controller, aggregated request data for the plurality of load balancers in the distributed computer system, the aggregated request data comprising a total number of requests received by the plurality of load balancers in the distributed computer system; and computing, by each load balancer of the plurality of load balancers in the distributed computer system, a subset size for the load balancer based on a percentage of the aggregated request data associated with the load balancer.

9. The method of claim 8, wherein the subset size comprises a number of connections between one or more clients and one or more back-end servers.

10. The method of claim 8, further comprising:

periodically recomputing, by each load balancer of the plurality of load balancers in the distributed computer system, a number of requests received at the load balancer;

sending, from each load balancer of the plurality of load balancers in the distributed computer system to the one or more traffic aggregators, an updated request report including the recomputed number of requests received at that load balancer;

receiving, at each load balancer of the plurality of load balancers in the distributed computer system, from the traffic controller, updated aggregated request data for the plurality of load balancers in the distributed computer system; and recomputing, by each load balancer of the plurality of load balancers in the distributed computer system, the subset size for the load balancer based on a percentage of the updated aggregated request data associated with that load balancer.

11. The method of claim 8, wherein each of the one or more traffic aggregators sends aggregated request data from each of a plurality of load balancers in a zone corresponding to that traffic aggregator to the traffic controller.

12. The method of claim 8, wherein computing, by each load balancer of the plurality of load balancers in the distributed computer system, a subset size for the load balancer based on a percentage of the aggregated request data associated with the load balancer comprises:

determining a percentage of the total number of requests received at the load balancer; and multiplying the determined percentage by a number of back-end servers in the distributed computing system.

13. A system comprising:

a processor for executing computer program instructions; and a non-transitory computer-readable storage medium storing computer program instructions executable by the processor to perform operations for dynamically subsetting a plurality of load balancers in a distributed computer system, the operations comprising:

receiving, at each of one or more traffic aggregators from each of a plurality of load balancers in a zone corresponding to that traffic aggregator, a request report including a number of requests received by that load balancer;

sending, from each of the one or more traffic aggregators to a traffic controller, aggregated request data for the corresponding zone, the aggregated request data comprising a total number of requests received by the load balancers in the zone;

computing, by the traffic controller based on the aggregated request data for each zone, a total number of requests received by all of the load balancers in the distributed computer system; and sending, from the traffic controller to each of the plurality of load balancers in the distributed computer system, data corresponding to the total number of requests received by all of the load balancers in the distributed computer system, wherein each load balancer of the plurality of load balancers in the distributed computer system computes a subset size based, at least in part, on a percentage of the total number of requests that are received at the load balancer.

14. The system of claim 13, wherein the subset size comprises a number of connections between one or more clients and one or more back-end servers.

15. The system of claim 13, wherein a request received by a load balancer comprises a request for a connection from a client to one or more back-end servers.

16. The system of claim 13, wherein the operations further comprise:

periodically recomputing, by the traffic controller, the total number of requests based on updated aggregated request data received from each of the one or more traffic aggregators; and sending, by the traffic controller, an updated total number of requests to each of the plurality of load balancers in the distributed computer system, wherein each load balancer of the plurality of load balancers in the distributed computer system computes an updated subset size based on a percentage of total demand that is received at the load balancer.

17. The system of claim 16, wherein the operations further comprise:

determining, by at least one traffic aggregator of the one or more traffic aggregators, that an updated request report has not been received from at least one load balancer in the corresponding zone; and computing, by the at least one traffic aggregator, updated aggregated request data based in part on a most recent request report received from the at least one load balancer.

18. The system of claim 13, wherein the operations further comprise:

detecting, by at least one traffic aggregator of the one or more traffic aggregators, an addition of at least one load balancer to the distributed computer system;

sending updated aggregated request data to the traffic controller, the updated aggregated request data including a number of requests received at the additional load balancer;

computing, by the traffic controller based on the updated aggregated request data, an updated total number of requests; and sending, from the traffic controller to each load balancer of the plurality of load balancers in the distributed computer system, the updated total number of requests, wherein each load balancer of the plurality of load balancers in the distributed computer system computes an updated subset size based on a percentage of total demand received at the load balancer.

19. The system of claim 13, wherein the operations further comprise:
   storing, by the traffic controller, historical data regarding the number of requests received at the plurality of load balancers in the distributed computer system;
   predicting, using the stored historical data, upcoming demand on the plurality of load balancers in the distributed computer system; and
   determining, based on the predicted upcoming demand, whether to add additional load balancers to the distributed computer system.

* * * * *

UNITED STATES PATENT AND TRADEMARK OFFICE
CERTIFICATE OF CORRECTION

PATENT NO. : 11,695,827 B2
APPLICATION NO. : 17/480906
DATED : July 4, 2023
INVENTOR(S) : Varanasi et al.

Page 1 of 1

It is certified that error appears in the above-identified patent and that said Letters Patent is hereby corrected as shown below:

In the Claims

In Column 10, in Claim 7, Line 56, after "demand" delete "levels".

In Column 10, in Claim 7, Lines 58-59, delete "demand levels," and insert -- demand, --, therefor.

Signed and Sealed this
Twenty-sixth Day of September, 2023

Katherine Kelly Vidal
*Director of the United States Patent and Trademark Office*